Patented Jan. 26, 1954

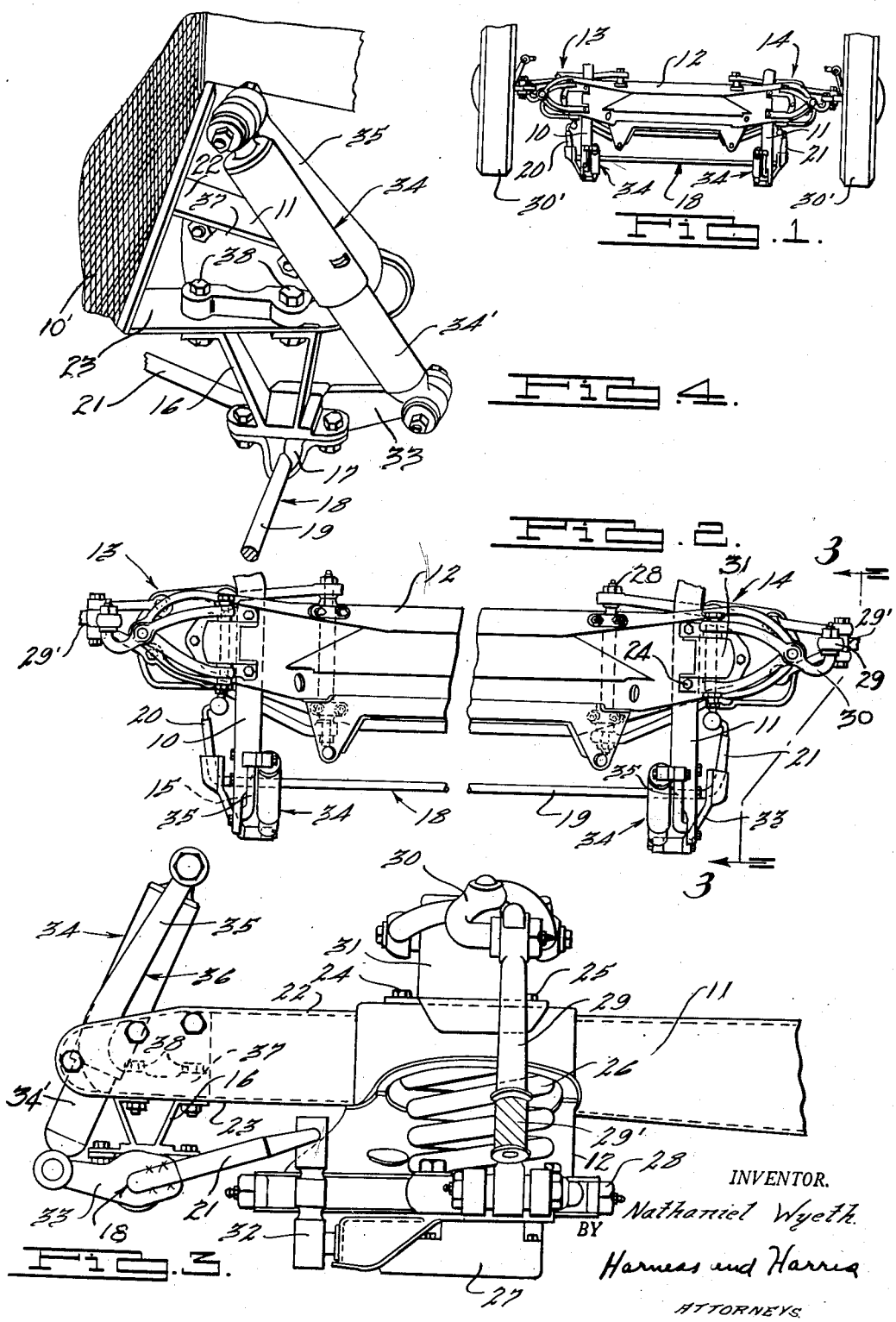

2,667,346

UNITED STATES PATENT OFFICE 2,667,346

SUSPENSION

Nathaniel Wyeth, Dearborn, Mich., assignor to Chrysler Corporation, Highland Park, Mich., a corporation of Delaware Application January 6, 1950, Serial No. 137,053

1 Claim. (Cl. 267—8)

My invention relates to vehicle suspension systems and more particularly to the shock absorber adaptation thereto.

A principal object of my invention is to provide a vehicle suspension system with an improved shock absorber mounting for eliminating a great amount of aeration of the shock absorber.

Another object of my invention is to provide a motor vehicle suspension system with an improved shock absorber mounting which employs the sway bar of the suspension system for actuating the shock absorber.

A further object of my invention is to provide a motor vehicle suspension system with a shock absorber mounting which is inexpensive as well as durable in construction.

Another object of my invention is to provide an article of manufacture of novel construction capable of providing sway control and shock absorber actuation.

Still another object of my invention is to provide an improved shock absorber mounting which may be conveniently added to motor vehicles of known types.

Other objects of my invention are to provide in structure of this type a shock absorber having its piston end mounted on the sprung portion of the vehicle and having its reservoir end secured to a small extension of the vehicle sway bar to thereby facilitate a small amount of actuation of the shock absorber relative to the actuation of the wheel associated with the suspension system.

Other objects and advantages will become more apparent from the following description of one embodiment of my invention, reference being had to the accompanying drawings in which:

Fig. 1 is a plane view of the front end of a vehicle frame structure and suspension assembly embodying my invention.

Fig. 2 is an enlarged view of the frame structure and suspension assemblies of Fig. 1 showing my invention in detail.

Fig. 3 is an end view taken on the line 3—3 of Fig. 2.

Fig. 4 is a perspective view of a portion of the front frame structure and suspension assembly to better illustrate my invention.

In Fig. 1 I have shown a plan view of the front end of a motor vehicle frame and suspension assembly including a pair of longitudinally extending side rails 10 and 11 which are connected by a transversely disposed cross member 12. The side rails 10 and 11 support a conventional radiator grille 19' (as shown in Fig. 4). Each of the side rails 10 and 11 are provided with vehicle wheel suspension assemblies, generally designated by the numerals 13 and 14, respectively. The frame members are also provided with depending mounting brackets 15 and 16 which are provided with rubber bearings 17 for receiving a torsion sway bar, generally designated by the numeral 18. The sway bar 18 is provided with a transversely extending central torsion section 19 having lever portions 20 and 21 integrally connected and extending longitudinally of the vehicle at each end of the section 19 for operative connection with the suspension assemblies 13 and 14 respectively. Since each suspension 13 and 14 and its associated structure are identical, I will confine the description to the suspension assembly 14 and its associated structure.

The frame member 11 as well as 10 is of a channel-like cross sectional configuration having upper and lower horizontal sections 22 and 23, the former being secured to one end of the cross member 12 by bolts 24 and 25. This last-mentioned end of the cross member 12 is a hollow-like construction and acts to anchor the upper end of a coil spring 26. The lower end of the coil spring 26 is carried by a pan 27 which in turn is secured to a lower control arm 28. The lower control arm 28 has its innermost extremity pivotally connected to the lower surface of the cross member 12 while its outwardly extending extremity is pivotally connected to one end of an upright knuckle bracket 29. The other end of the upright knuckle bracket 29 is pivotally connected to an upper control arm 30, the other end of which is pivotally carried by a support member 31, the support member being mounted on the cross member 12 substantially above the side rail 11. The upright knuckle bracket 29 is provided with a king pin boss 29' which forms a portion of a king pin assembly for securing a steerable vehicle ground wheel 30' to the suspension assembly 14.

The lever 21 of the sway bar 18 has its free end pivotally connected to a yoke 32 which in turn is carried by the pan 27. In accordance with my invention, the sway bar 18 is provided with another lever 33 which is secured to the sway bar at approximately the juncture of the central portion 19 and the lever 21 and is welded or in some other fashion securely fixed thereto so that the lever 33 will rotate about the longitudinal axis of the central portion 19 in a like manner as the lever 21. The free end of the lever 33 is pivotally mounted to the lower reservoir end 34' of a hydraulic shock absorber designated by the numeral 34. The other end of the shock absorber 34 is pivotally mounted at the free end of the leg 35 of an L-shaped bracket generally 36. The other leg 37 of the bracket 36 is bolted to the top side of the lower horizontal section 23 of the side rail 11 by bolts 38 which are also used to secure the depending bracket 16 to the underside of this section.

In the broader aspects of my invention the sway bar, which is preferably generally U-shaped or bow-shaped as illustrated, may be mounted in any desired manner such that its ends are operatively connected to the lower control arms 28 or other parts which rise and fall with the wheels to torsionally stress the central sway bar portion 19. When one wheel rises or falls relative to the other wheel the sway bar is torsionally stressed in transmitting force to such other wheel tending to raise or lower the latter, this being a well-known function of torsion sway bars of the general type illustrated in resisting tilt or sway of the vehicle sprung portions. Although torsion in the sway bar is reduced and practically nil when the wheels rise and fall in unison it will be apparent that my shock absorbers will operate whenever there is any relative movement between the wheels and the vehicle sprung portions.

I have provided a novel article of manufacture in the form of bar means comprising a one-piece torsion sway bar 18 of simple U or bow-shape provided with shock absorber actuating levers 33 carried by the sway bar adjacent the juncture of the bar lever portions 20, 21 and the main body portion 19. Each lever 33 forms in effect an extension of a bar lever 20, 21 beyond the torsion body portion 19. If desired the levers 33 may be formed integrally with the body 19 of the bar means and the levers 20, 21 welded thereto or the entire bar means may be forged or otherwise fashioned as a unitary one-piece device.

One of the primary objects of my invention is to provide a structure which would limit the aeration of a conventional hydraulic shock absorber. In accordance with my invention, the aeration of the shock absorber 34 is less than the aeration of most shock absorbers of conventional construction due to its reduced stroke. The stroke of the shock absorber may be reduced in one way by making the lever 33 shorter than the lever 21. The stroke may also be reduced by moving the connection of the lever 21 to the lower control arm closer to the pivotal connection of this arm 28 on the cross member 12. In accordance with my invention however, my improved structure may be conveniently added to many vehicles by merely securing the lever 33 and the L-shaped bracket in place and installing the shock absorber.

In such cases where a reduced stroke is applied to a shock absorber, a type of absorber which has the same effectiveness for a stroke which is shorter than the average distance should be used.

The reduction in stroke of a hydraulic type shock absorber is naturally accompanied by less movement of the reservoir portion of the absorber where, as illustrated, the reservoir portion is mounted on the unsprung part of the vehicle. Less movement of this reservoir portion limits the aeration of the hydraulic medium therein and the stroke of the absorber is made in a smooth even fashion.

While I have illustrated and described but one embodiment of my invention, it is to be understood that such is for the purpose of illustration only, and it is contemplated that those skilled in the art may modify certain details without departing from the spirit or scope of the invention as defined in the claim appended hereto.

I claim:

In a motor vehicle having a sprung portion and spaced wheels, suspensions for effecting operative connections between said sprung portion and said wheels, each comprising means pivotally connecting each of said wheels with said sprung portion for accommodating rising and falling movement of said wheels relative to said sprung portion, a generally U-shaped sway bar having a center portion extending transversely of said vehicle and leg portions each operatively connected to one of said suspensions for rocking movement in response to rising and falling of said wheels, spaced supports on said sprung portion carrying said sway bar including bearing portions engaging said center portion of said sway bar and accommodating axial rotation thereof, extension members for each of said leg portions secured to said sway bar, spaced generally L-shaped brackets each having one leg secured to said sprung portion and each having its other leg extending upwardly, and shock absorbers, each being pivotally connected between one of said extension members and said other leg of one of said brackets, said extension members actuating said absorbers in response to rocking movement of said sway bar leg portions.

NATHANIEL WYETH.

References Cited in the file of this patent

UNITED STATES PATENTS

| Number | Name | Date |
|---|---|---|
| 2,108,524 | Burton | Feb. 15, 1938 |
| 2,122,839 | Guy | July 5, 1938 |
| 2,190,298 | Slack | Feb. 13, 1940 |
| 2,241,827 | Rabe | May 13, 1941 |
| 2,253,645 | Paton | Aug. 26, 1941 |

FOREIGN PATENTS

| Number | Country | Date |
|---|---|---|
| 535,651 | Great Britain | Apr. 17, 1941 |
| 748,120 | France | June 29, 1933 |